United States Patent [19]
Hamada

[11] Patent Number: 5,960,128
[45] Date of Patent: Sep. 28, 1999

[54] FOCUS CONTROL METHOD FOR SENSING AN IMAGE OF HIGH RESOLUTION BY PERFORMING PIXEL SHIFTING, AND IMAGE INPUT APPARATUS EMPLOYING THE METHOD

[76] Inventor: Tetsuya Hamada, c/o Canon Kabushiki Kaisha, 30-2, Shimomaruko 3-chome, Ohta-ku, Tokyo, Japan

[21] Appl. No.: 08/865,204

[22] Filed: May 29, 1997

[30] Foreign Application Priority Data

Jun. 7, 1996 [JP] Japan .................................... 8-145810

[51] Int. Cl.$^6$ ................................................. G06K 9/20
[52] U.S. Cl. ......................................................... 382/312
[58] Field of Search ................................. 355/35, 55, 71; 250/208.1; 348/219, 271, 279, 280, 263–265, 322, 332, 335, 448; 359/554–557, 401; 382/312, 255; 396/104, 111

[56] References Cited

U.S. PATENT DOCUMENTS

| | | | |
|---|---|---|---|
| 4,816,910 | 3/1989 | Hashimoto et al. | 348/247 |
| 5,155,518 | 10/1992 | Utagawa | 396/104 |
| 5,402,171 | 3/1995 | Tagami et al. | 348/219 |
| 5,436,661 | 7/1995 | Yamamoto et al. | 348/264 |
| 5,523,887 | 6/1996 | Wight | 359/556 |
| 5,712,700 | 1/1998 | Nagaishi et al. | 355/35 |

*Primary Examiner*—Jose L. Couso
*Attorney, Agent, or Firm*—Morgan & Finnegan LLP

[57] ABSTRACT

For focusing an image input apparatus before generating a single high-resolution image by the image input apparatus from a plurality of images obtained from an image sensing device by performing pixel shifting operation, first, image data is obtained without performing pixel shifting operation, and a lens unit is moved on the basis of the obtained image data to bring the image input apparatus into focus, then the position of the lens unit is temporarily fixed in the focused state. Thereafter, image data of a plurality of images are obtained in the above focused state by performing pixel shifting operation, then image data of a high-resolution image is generated from the image data of the plurality of images. Further, the lens unit is moved again on the basis of the image data of the high-resolution image to bring the image input apparatus into focus.

12 Claims, 7 Drawing Sheets

| | | | | |
|---|---|---|---|---|
| FIG. 5A | → | FIG. 5B | → | FIG. 5C | → | FIG. 5D |

| NORMAL MODE | | A1 | | A2 | | A3 | | A4 |
|---|---|---|---|---|---|---|---|---|
| | | | B1 | | B2 | | B3 | |
| FRAME MODE | C1 | | C2 | | C3 | | C4 | |
| | | D1 | | D2 | | D3 | | D4 |
| LINE 1 | Cy | Ye | Cy | Ye | Cy | Ye | Cy | Ye |
| LINE 2 | G | Mg | G | Mg | G | Mg | G | Mg |
| LINE 3 | Cy | Ye | Cy | Ye | Cy | Ye | Cy | Ye |
| LINE 4 | Mg | G | Mg | G | Mg | G | Mg | G |
| LINE 5 | Cy | Ye | Cy | Ye | Cy | Ye | Cy | Ye |
| LINE 6 | G | Mg | G | Mg | G | Mg | G | Mg |
| LINE 7 | Cy | Ye | Cy | Ye | Cy | Ye | Cy | Ye |
| LINE 8 | Mg | G | Mg | G | Mg | G | Mg | G |

FOCUS CONTROL METHOD FOR SENSING AN IMAGE OF HIGH RESOLUTION BY PERFORMING PIXEL SHIFTING, AND IMAGE INPUT APPARATUS EMPLOYING THE METHOD

BACKGROUND OF THE INVENTION

The present invention relates to a focus control method and an image input apparatus employing the method and, more particularly, to a focus control method for sensing an image of high resolution by performing pixel shifting operation, i.e., an operation for shifting an image formation position of an incoming optical image on a solid-state image sensing device, and an image input apparatus employing the control method.

Figure 4:
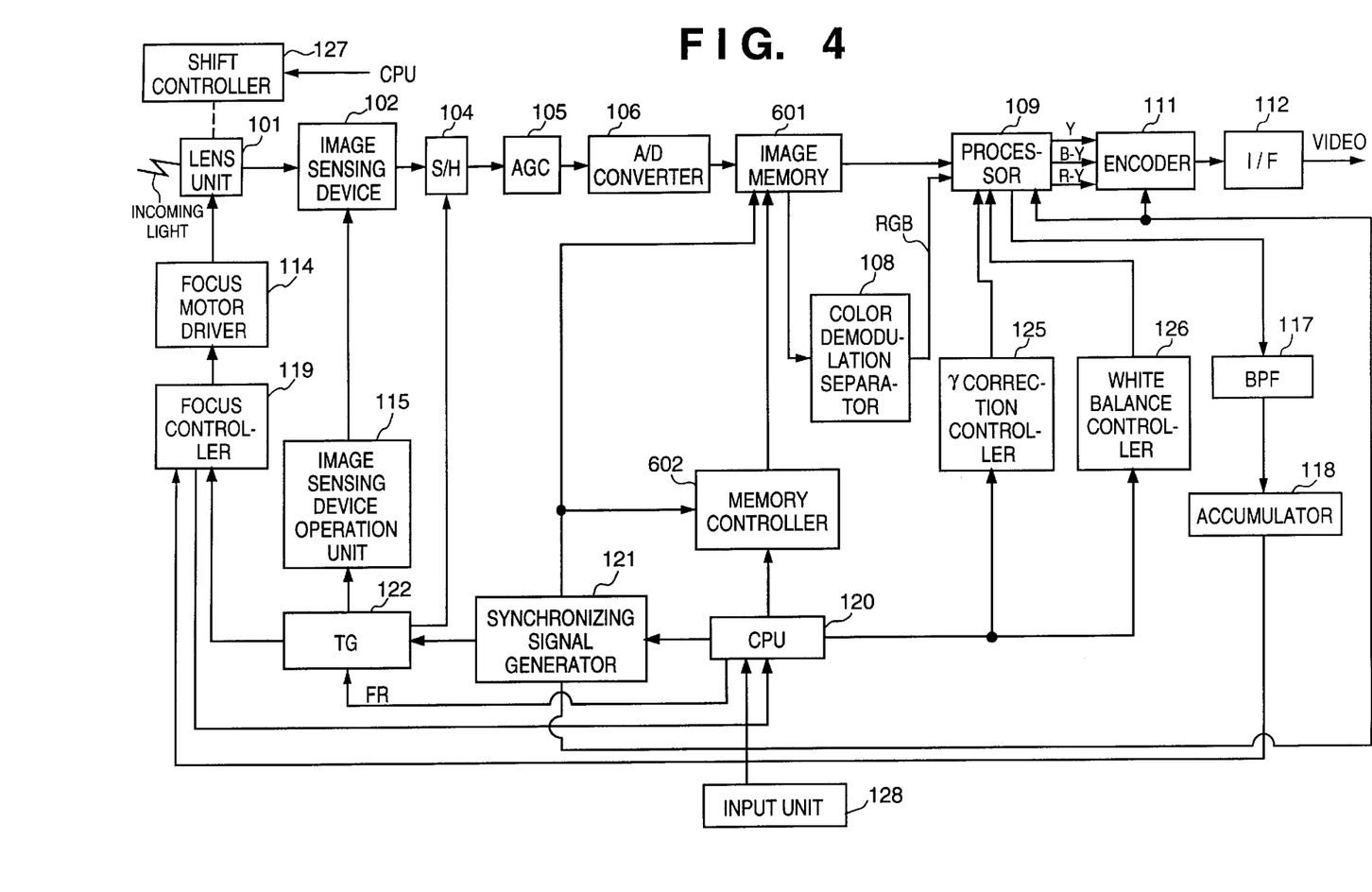
FIG. 4 is a block diagram illustrating a configuration of the conventional image sensing apparatus.
Figure 5A:
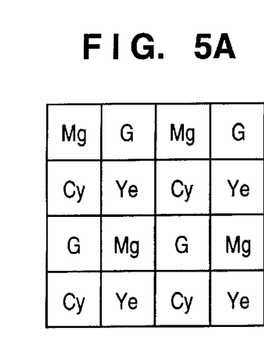
FIGS. 5A to 5P are explanatory views showing pixel shifting operation shifting by half pixel.
Figure 5B:
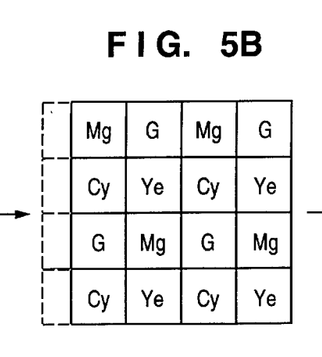
Figure 5C:
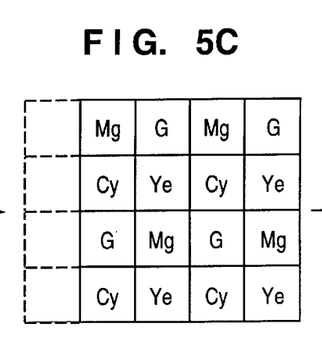
Figure 5D:
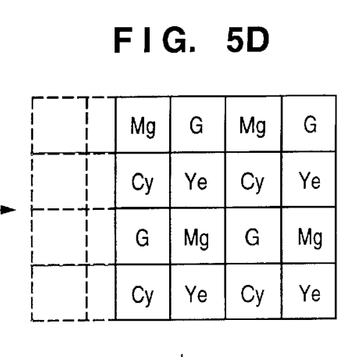
Figure 5E:
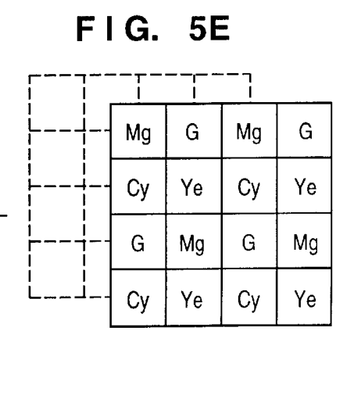
Figure 5F:
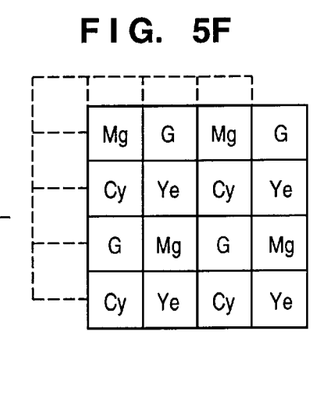
Figure 5G:
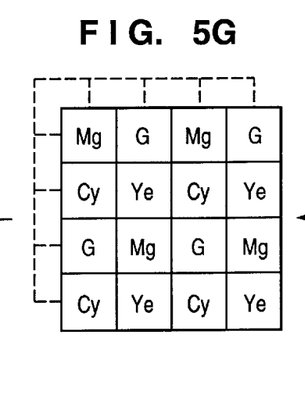
Figure 5H:
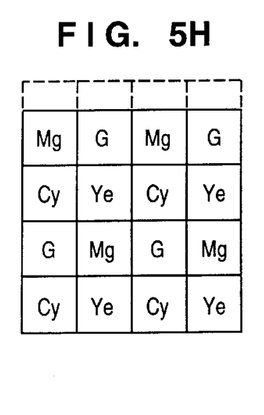
Figure 5I:
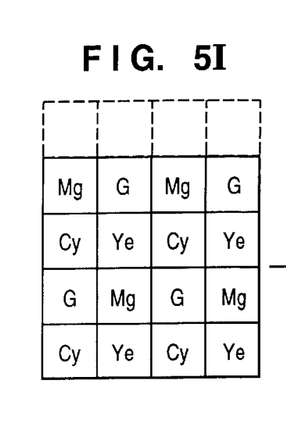
Figure 5J:
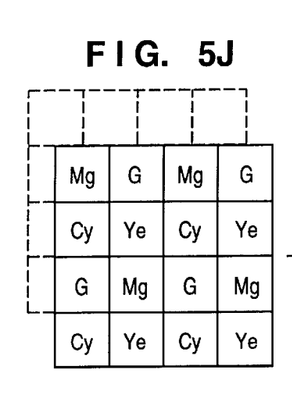
Figure 5K:
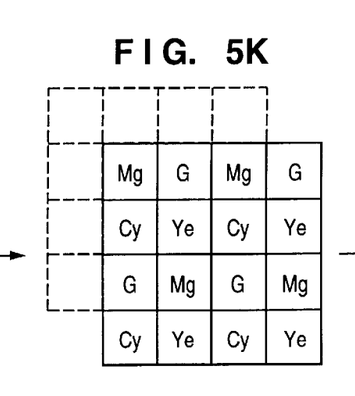
Figure 5L:
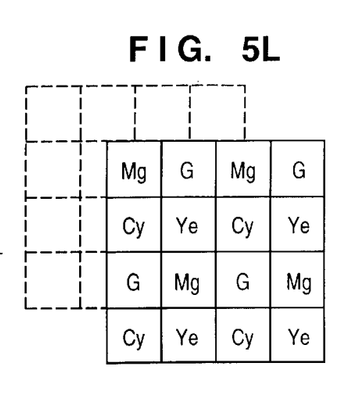
Figure 5M:
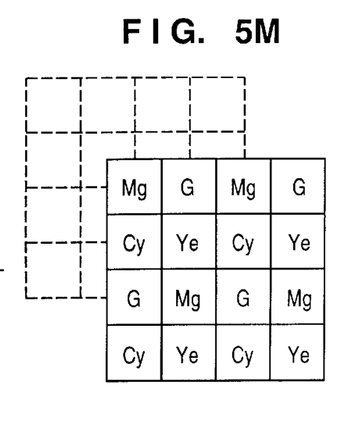
Figure 5N:
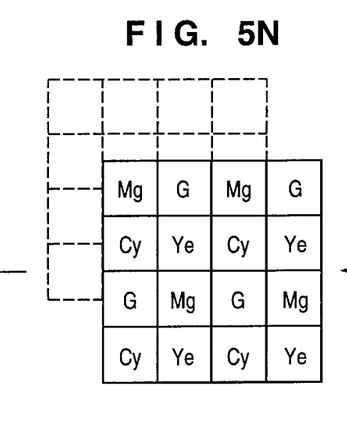
Figure 5O:
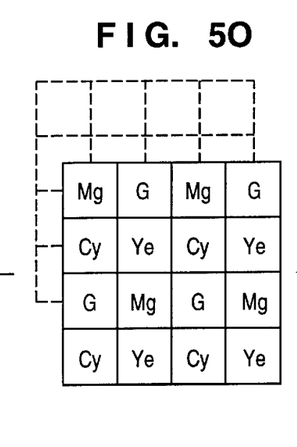
Figure 5P:
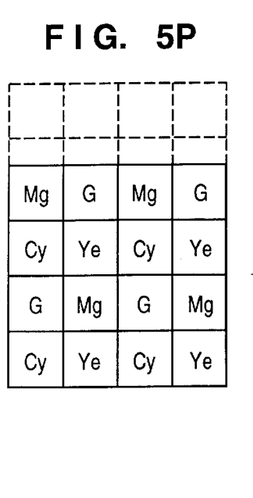

FIG. 4 is a block diagram briefly illustrating a configuration of a conventional image input apparatus, and FIGS. 5A to 5P are explanatory views showing pixel shifting operation shifting by half pixel.

In FIG. 4, reference numeral 101 denotes a lens unit including a focusing function; 102, a solid-state image sensing device (simply referred by "image sensing device", hereinafter), such as CCD, covered with a complementary color (green (Gr), yellow (Ye), magenta (Mg), cyan (Cy)) mosaic filter; 104, a sample-and-hold (S/H) circuit for sampling and holding image signals; 105, an automatic gain controller (AGC) for performing automatic gain control; 106, an analog-digital (A/D) converter for converting analog signals to digital signals; 601, an image memory for storing a complementary color image; and 602, a memory controller for controlling the image memory 601.

Further, reference numeral 108 denotes a color demodulation separator which converts input signals to primary color signals (R, G, and B signals) and outputs them; 109, a processor which performs signal processes, such as white balance processing and γ correction, and outputs a luminance signal and color difference signals; 111, an encoder which generates a video signal of a predetermined format on the basis of the luminance signal and the color difference signals; 112, an interface (I/F) for outputting the video signal; 114, a focus motor driver for driving a focus motor provided in the lens unit 101; 115, an image sensing device operation unit for operating the image sensing device 102; 117, a band-pass filter (BPF) for extracting high frequency components to be used for determining a focus state from image signals; 118, an accumulator for accumulating data (evaluation value) to be used for obtaining the direction and speed at which the lens unit 101 is to be moved (referred by "focusing data", hereinafter) using the outputs from the BPF 117; 119, a focus controller for controlling the focus motor driver 114; 120, a CPU for controlling the entire operation of the image input apparatus; 121, a synchronizing signal generator for generating a synchronizing signal; 122, a timing signal generator (TG) for generating a timing pulse for operating the image sensing device operation unit 115 on the basis of the synchronizing signal from the synchronizing signal generator 121; 125, a γ correction controller for controlling the γ correction processing; 126, a white balance controller for controlling the white balance processing; 127, a known shift controller for performing pixel shifting which is controlled by the CPU 120; and 128, an input unit, such as a keyboard and a pointing device.

Figure 6:
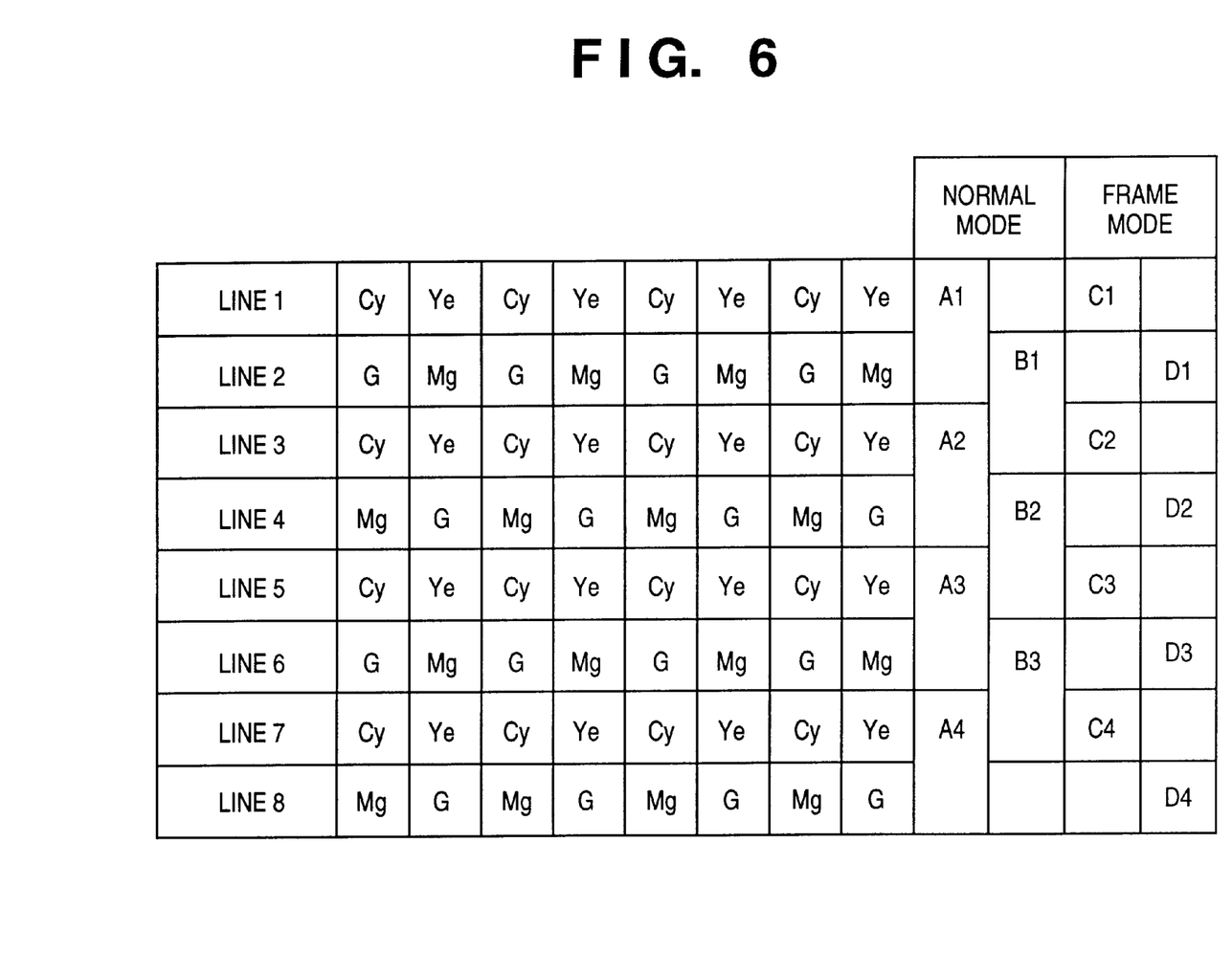
FIG. 6 is an explanatory view showing an arrangement of a complementary color filter, a frame mode, and a normal mode.

When colors of the complementary color mosaic filter are arranged as shown in FIG. 6, the CPU 120 is able to operate the timing signal generator 122 in two different modes by using a control signal (FR). One is a normal mode in which image signals are read while combining charges of two pixels adjoining in the horizontal direction, as A1, A2, B1 and B2 in FIG. 6. The other is a frame mode, and image signals are independently read by every other line, as C1, C2, D1 and D2 in FIG. 6, without combining charges of two pixels adjoining in the horizontal direction. It is assumed that the above conventional image input apparatus reads image signals in the frame mode when performing pixel shifting operation, and in the normal mode otherwise.

Next, an operation of the image input apparatus having the above configuration will be described below.

Light incoming through the lens unit 101 is converted into electric charges by the image sensing device 102. Obtained electric signals, i.e., image signals, are sampled by the S/H circuit 104, then amplified by a controlled gain in the AGC 105. The amplified image signals are converted into digital signals by the A/D converter 106 and stored in the image memory 601 as a complementary color image. The complementary color image signals stored in the image memory 601 are read under control of the memory controller 602 to the color demodulation separator 108 where the complementary image signals are converted into R, G and B signals.

Different processes are performed for converting the complementary image signals into the R, G and B signals when the image signals are read in the normal mode and when the image signals are read in the frame mode. First, a case where the image signals are read in the frame mode is explained.

The image signals are independently read while performing pixel shifting operation as shown in FIG. 5A to FIG. 5P. With the pixel shifting operation, image data of four colors, namely Ye, Cy, G and Mg, at sampling points which are four times finer than the pixel positions of the image sensing device 102 is obtained. The image data obtained as above is converted into R, G and B signals by performing the following matrix operation.

$$\begin{pmatrix} R \\ G \\ B \end{pmatrix} = \begin{pmatrix} a11 & a12 & a13 & a14 \\ a21 & a22 & a23 & a24 \\ a31 & a32 & a33 & a34 \end{pmatrix} \begin{pmatrix} Ye \\ Cy \\ G \\ Mg \end{pmatrix} \quad \text{Equation (1)}$$

Next, a case where the image signals are read in the normal mode is explained.

As seen in FIG. 6, when image signals are read while combining charges of two pixels adjoining in the vertical direction in, e.g., the first and second lines (A1), the third and fourth lines (A2), and so on, then every four lines, image signals corresponding to the sum of the charges in pixels at Mg filter positions and at Ye filter positions (Mg+Ye), the sum of the charges in pixels at G filter positions and at Cy filter positions (G+Cy), the sum of the charges in pixels at Mg filter positions and at Cy filter positions (Mg+Cy), and the sum of the charges in pixels at G filter positions and at Ye filter positions (G+Ye) are obtained. With these four kinds of image signals, a luminance signal and color difference signals are generated by using the following equations.

$$Y = ((G + Cy) + (Mg + Ye))/2 \quad \text{Equations (2)}$$
$$R - Y =$$
$$(Mg + Ye) - (G + Cy) - B - Y = (G + Ye) - (Mg + Cy)$$

Similarly, when image signals are read while combining charges of two pixels adjoining in the vertical direction in, e.g., the second and third lines (B1), the fourth and fifth lines (B2), and so on, four kinds of image signals, namely, (Mg+Ye), (G+Cy), (G+Ye), and (Mg+Cy), are obtained every four lines. Therefore, the luminance signal and the color difference signals are also obtained by using the equations (2).

With the luminance signal and the color difference signals obtained as above, the R, G and B signals are generated by performing the following matrix operation.

$$\begin{pmatrix} R \\ G \\ B \end{pmatrix} = \begin{pmatrix} a11 & a12 & a13 \\ a21 & a22 & a23 \\ a31 & a32 & a33 \end{pmatrix} \begin{pmatrix} Y \\ R-Y \\ -B-Y \end{pmatrix}$$ Equation (3)

The processor 109 performs γ correction and white balance processing under control of the γ correction controller 125 and the white balance controller 126, and outputs color difference signals, R-Y and B-Y, and a luminance signal Y. The output signals are converted into video signals by the encoder 111, then outputted to outside via the I/F 112. The synchronizing signal generator 121 generates a synchronizing signal, and the timing signal generator 122 generates a pulse signal on the basis of the synchronizing signal. The image sensing device operation unit 115 and the focus controller 119 controls the image sensing device 102 and the focus, respectively, in accordance with the pulse signal. Further, the S/H circuit 104, the processor 109, and the encoder 111 also operate in synchronization with the synchronizing signal.

In such the image input apparatus, a single image of high resolution is obtained by performing pixel shifting operation in the following manner. First, light path of an incoming optical image or the image sensing device 102 is shifted by a predetermined amount (e.g., half pixel) by the shift controller 127 so as to interpolate image data between pixels, as shown in FIGS. 5A to 5P, and an image is taken at each shifted position to obtain a plurality of images (16 images in the case of FIGS. 5A to 5P). Thereafter, the obtained plurality of images are combined to generates a signal image of high resolution.

Further, in a case of performing an automatic focusing operation, when pixel shifting operation shifting by half pixel is performed, the high frequency components, which are necessary for determining a focus state, are extracted from image signals, outputted from the processor 109 by using RGB image data of a single image which is generated from the complementary color image data of 16 images sensed at the positions shown in FIGS. 5A to 5P, by the BPF 117. Then focusing data is accumulated by the accumulator 118 from the extracted high frequency components, and the focus controller 119 calculates the direction and speed at which the lens unit 101 is moved on the basis of the accumulated focusing data. Finally, the focus motor driver 114 drives the focus motor to move the lens unit 101.

In another way of performing the automatic focusing operation, an image is focused first without performing pixel shifting operation, then the position of the lens unit 101 is fixed when the image is focused. Thereafter, pixel shifting operation is performed to obtain an image of high resolution.

With the above configuration of the conventional image input apparatus, in order to obtain an RGB image of high resolution from a plurality of complementary color images by performing pixel shifting operation, color component data of four colors, namely three complementary colors, magenta, cyan and yellow, and green are needed for each pixel of the RGB image of high resolution. Therefore, if the pixel shifting operation shifting by half pixel is performed, as shown in FIGS. 5A to 5P, the aforesaid color component data of four colors for each pixel of the RGB image of high resolution can not be obtained until sixteen image sensing and data taking operations are completed. Thus, it takes a considerable time for the image input apparatus to generate image signals which are processed with various color processing operations. Furthermore, in a conventional image input apparatus which accumulates data for an automatic focusing operation or an automatic iris control operation by using processed image signals, there is a time gap before the iris is adjusted and an image is properly focused.

Further, in the method for obtaining an image of high resolution by focusing the image input apparatus on the basis of an image obtained before performing pixel shifting operation and fixing the position of the lens unit 101 when the image is focused, then performing the pixel shifting operation for shortening the time to focus on the image, since the resolution of the image used for focusing the image input apparatus is lower than the resolution of an image obtained after pixel shifting operation, there is a problem in which the resultant resolution of the image of high resolution is low because only a low focus level is achieved.

SUMMARY OF THE INVENTION

The present invention has been made in consideration of the above situation, and has as its object to provide a focus control method and an image input apparatus employing a method capable of shortening the time to bring the image input apparatus into focus and achieving a better focus level by controlling a lens unit when sensing an image of high resolution by performing pixel shifting operation.

According to the present invention, the foregoing object is attained by providing a focus control method used when generating a single high-resolution image from a plurality of images sensed by an image sensing device by performing pixel shifting operation, the method comprising: a first focusing step of performing focusing operation on the basis of image data obtained without performing pixel shifting operation; a focus fixing step of temporarily fixing a focus in a focused state achieved as the result of the first focusing step; and a second focusing step of performing focusing operation on the basis of image data of a high-resolution image obtained in the fixed focus by performing pixel shifting operation.

According to the present invention, the foregoing object is also attained by providing an image input apparatus capable of generating a single high-resolution image from a plurality of images sensed by performing pixel shifting operation, the apparatus comprising: automatic focusing means for automatically focusing the image input apparatus on an image; and control means for, when generating a single high-resolution image by performing pixel shifting operation, controlling the automatic focusing means to focus the image input apparatus on the basis of image data obtained without performing pixel shifting operation, then to focus on the basis of image data of a high-resolution image obtained by performing pixel shifting operation.

Accordingly, the image input apparatus is brought into focus primarily on the basis of image signals obtained by an image sensing device without performing pixel shifting operation, then secondary focusing operation is performed on the basis of an image of high resolution obtained in the primary focused state, thereby a high focus level is achieved in a short time period.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

<First Embodiment>

Figure 1:
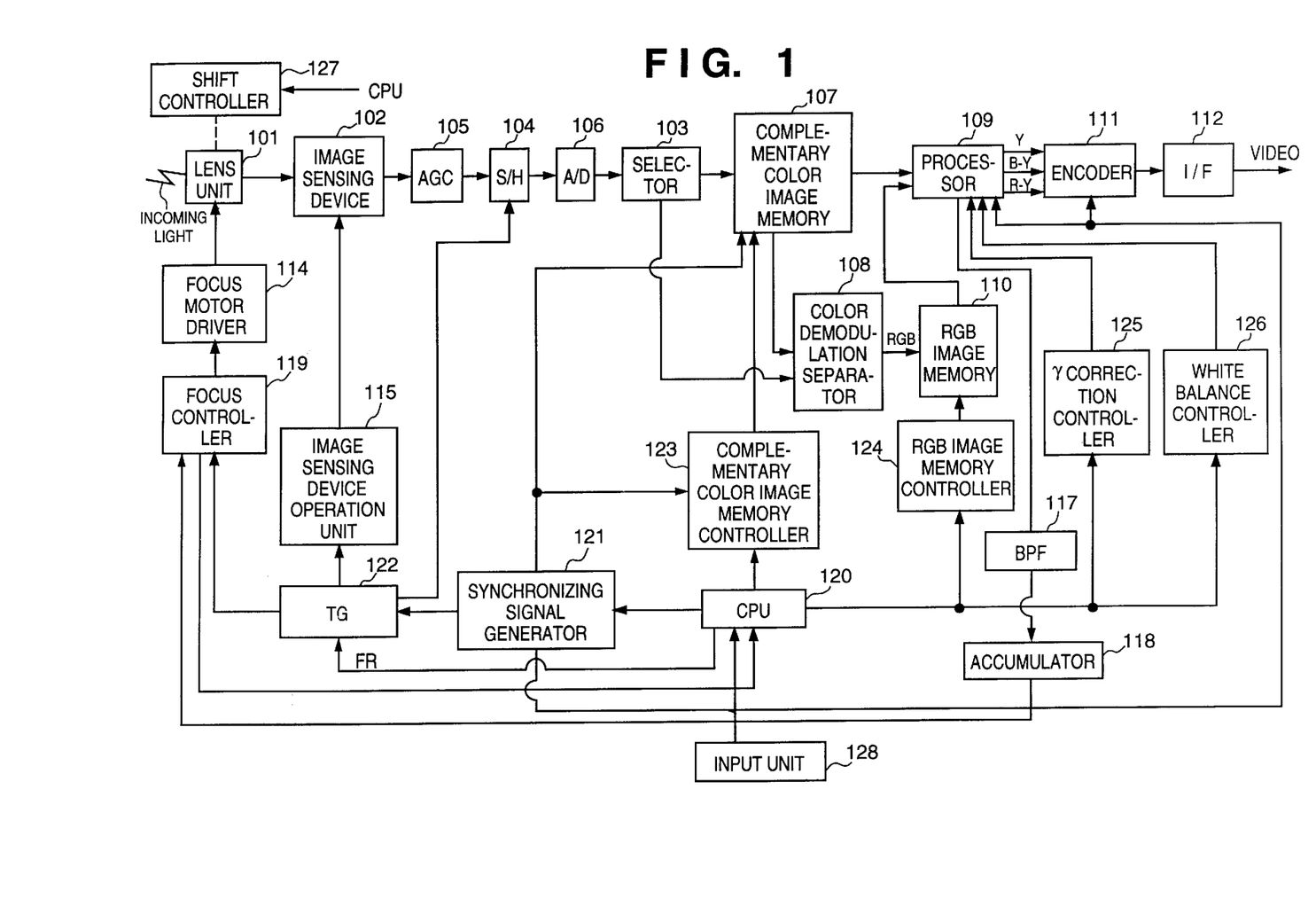
FIG. 1 is a block diagram illustrating a configuration of an image input apparatus according to an embodiment of the present invention.

FIG. 1 is a block diagram illustrating a configuration of an image input apparatus according to a first embodiment of the present invention.

In FIG. 1, the image memory 601 and the memory controller 602 in FIG. 4 are omitted, and units referred by reference numerals 103, 107, 110, 123, and 124 are added instead. Other units and elements in FIG. 1 are the same as those explained with reference to FIG. 4, thus those are referred by the same reference numerals and their explanations are omitted.

In FIG. 1, reference numeral 107 denotes a complementary color image memory for storing complementary color images when performing pixel shifting operation; 103, a selector for inputting image data to either the complementary color image memory 107 or the color demodulation separator 108; 110, an RGB image memory for storing R, G and B signals converted by the color demodulation separator 108; 123, a complementary color image memory controller for controlling the complementary color memory 107; and 124, an RGB image memory controller for controlling the RGB image memory 110.

Next, an operation of the image input apparatus having the aforesaid configuration will be described.

Referring to FIG. 1, light incoming through the lens unit 101 is converted into electric charges by the image sensing device 102. When sensing a high-resolution image in a normal operation (i.e., image sensing operation performed after the image input apparatus is brought into focus), image signals outputted from the image sensing device 102 are adjusted by controlled gains in the AGC 105 and sampled by the S/H circuit 104. The sampled image signals are converted into digital signals by the A/D converter 106, inputted to the color demodulation separator 108 selected by the selector 103, converted into RGB signals, then stored in the RGB image memory 110. Then, the processor 109 performs γ correction and white balance correction on the RGB image data under control of the γ correction controller 125 and the white balance controller 126, and outputs color difference signals R-Y and B-Y and a luminance signal Y. The output signals are converted into video signals by the encoder 111, then outputted to outside via the I/F 112.

The synchronizing signal generator 121 generates a synchronizing signal, and the timing signal generator 122 generates a pulse signal on the basis of the synchronizing signal. The image sensing device operation unit 115 and the focus controller 119 control the image sensing device 102 and the focus, respectively, in accordance with the pulse signal. Further, the S/H circuit 104, the processor 109, and the encoder 111 also operate in synchronization with the synchronizing signal.

Next, a method of focusing operation when obtaining an image of high resolution by performing the pixel shifting operation with the aforesaid image input apparatus will be described. In the first embodiment, in order to realize fast focusing, the image input apparatus is brought into focus to a predetermined level before performing the pixel shifting operation.

A sequence of automatic focusing operation by using the aforesaid image input apparatus is described with reference to FIG. 2. First, image data is obtained without performing pixel shifting operation. In this case, the image input apparatus is set to the normal mode as in the conventional image input apparatus (step S215 ). Complementary color image data obtained in the normal mode at step S201 is converted into RGB image data at step S202. Here, the conversion from the complementary color image data to the RGB image data is performed by using the equations (2) and (3), for example, explained in the background of the invention. At step S203, high frequency components necessary for determining a focus state are extracted from the image signals outputted from the processor 109 by the BPF 117, and the accumulator 118 accumulates focusing data to be used for the automatic focusing operation from the extracted high frequency components.

Here, a general method of automatic focusing control is briefly explained as an example.

Automatic focusing control is performed on the basis of a signal level of high frequency component (focus data) of an image within a predetermined area. When the image is focused, high frequency component is obtained, since the outline of the image is clear. On the other hand, when an image is defocused, only low frequency component is obtained, since the image is dim.

During automatic focusing control, signal level of high frequency component is kept calculated while moving a lens for focusing (lens unit 101), the obtained signal levels are stored in a memory, for instance, then the focus lens is stopped at the position where the greatest signal level is obtained. More specifically, the focus lens is moved in the direction which makes the signal level of high frequency component increase, however, the signal level suddenly starts decreasing when the lens passes a certain position. Therefore, it is determined that a position which is right before the position where the signal level starts decreasing is the focus position. Thus, the focus lens is moved back to the determined position, thereby the image is focused.

The above method of automatic focusing control is an example, and any known methods of automatic focusing control can be applied to the present invention.

Next at step S204, the lens unit 101 is moved in accordance with the aforesaid focusing data. Thereafter, at step S205, whether an image is focused or not is determined. Steps S201 to S205 are repeated until the image is focused. When it is determined that the image is focused to a predetermined level at step S205, then further focus control is performed by using an image of high resolution obtained after performing the pixel shifting operation so as to achieve a better focusing on the image to the level which bears displaying the image of high resolution.

In order to obtain image data while performing the pixel shifting operation, the image input apparatus is set to the frame mode (step S216) as in the case of the conventional image input apparatus. Next at step S206, complementary color image data is taken by performing the pixel shifting operation and processed. Then, the selector 103 switches to connect to the complementary color image memory 107 at step S207. At step S208, the processed complementary color image data is stored in the complementary color image memory 107. The above operation is repeated until it is determined at step S209 that the all the required image data for obtaining an image of high resolution is taken by performing the pixel shifting operation.

After all the required complementary color image data is taken, the complementary color image memory controller 123 controls to read image data from the complementary color image memory 107 in the order which is suitable for generating RGB image data at step S210, then RGB image data of an image of high resolution obtained by performing the pixel shifting operation is generated by the color demodulation separator 108 at step S211. Here, the conversion from the complementary color image data to the RGB image data is performed by using the equation (1) described in the background of the invention. At step S212, high frequency components needed for determining the focus state is extracted by the BPF 117 from the image signals outputted from the processor 109, then the accumulator 118 accumulates focus data from the extracted high frequency components. Next, the lens unit 101 is moved in accordance with the accumulated focus data at step S213. At step S214, the focus state is checked to determine whether or not the image is focused. Aforesaid steps S206 and S214 are repeated until it is determined at step S214 that the image is focused. When it is determined at step S214 that the image of high resolution is focused, all the focusing operation is completed.

According to the first embodiment as described above, it is possible to improve focusing precision in a shorter time period when sensing an image of high resolution by performing the pixel shifting operation by performing the focus control in the following sequence: focus the image input apparatus on the basis of an image obtained before performing pixel shifting operation; fix the lens unit when the image is focused; obtain an image of high resolution by performing pixel shifting operation; and finely adjust the focus of the image input apparatus on the basis of the image data of the high-resolution image.

It should be noted that, in the first embodiment, the primary focusing operation is performed on the basis of an image obtained before performing the pixel shifting operation and the secondary focusing operation is further performed to improve the focusing precision on the basis of an image of high resolution obtained by performing the pixel shifting operation performed in the same manner as in an image sensing operation for obtaining an image of high resolution, however, the present invention is not limited to this. For example, in the secondary focusing operation, it is possible to perform the focus control on the basis of an image obtained by combining a plurality of images obtained while shifting the image formation position of the image on the image sensing device less number of times, e.g., only in the vertical direction, horizontal direction, or oblique direction. In this manner, it is possible to achieve similar effect as that of the first embodiment in a shorter time period.

<Second Embodiment>

In the second embodiment, the image input apparatus described in the first embodiment with reference to FIG. 1 is used.

Figure 3:
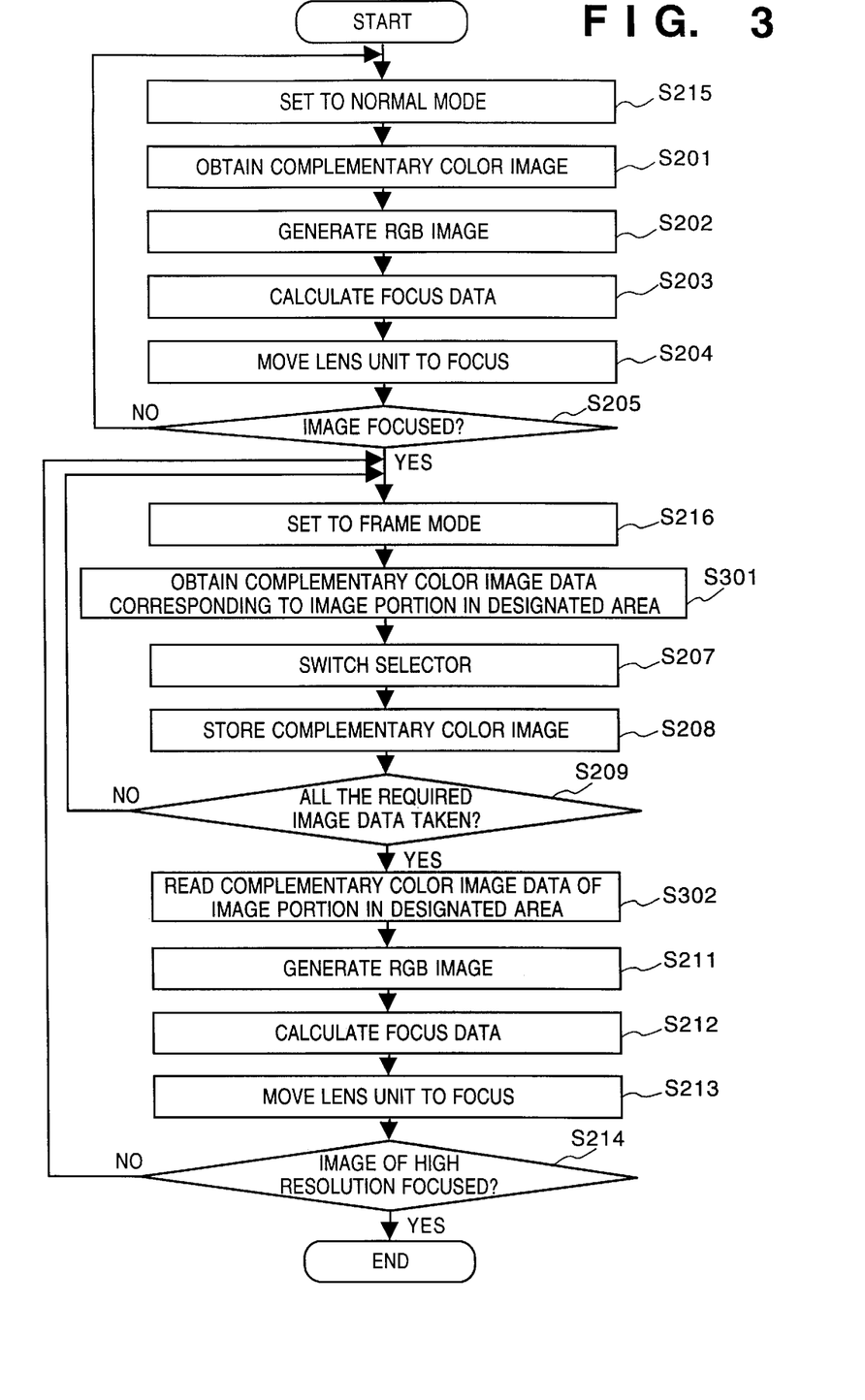
FIG. 3 is a flowchart showing a sequence of an automatic focusing operation according to a second embodiment of the present invention.

FIG. 3 is a flowchart showing a sequence of an automatic focusing operation according to the second embodiment of the present invention.

Figure 2:
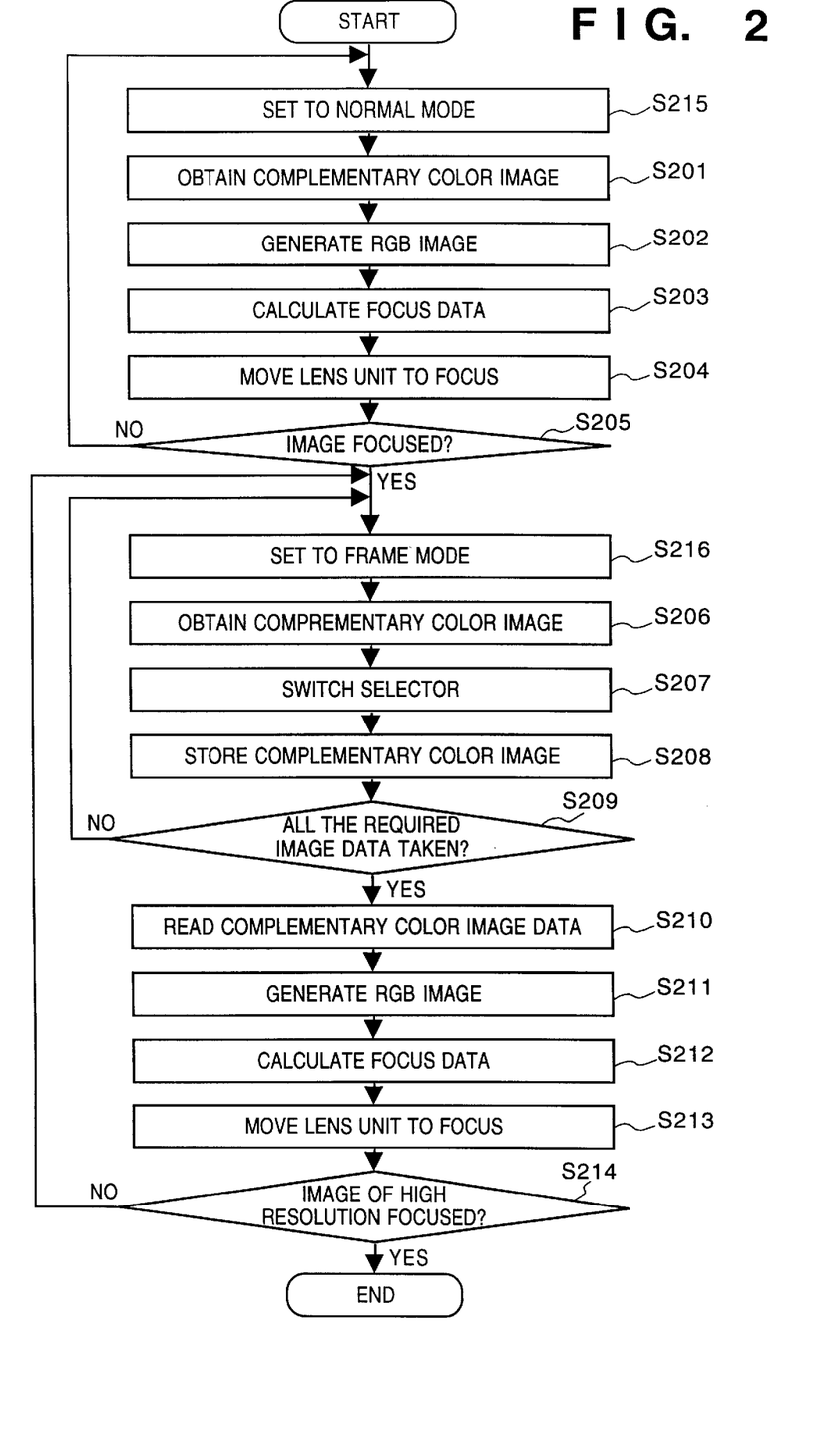
FIG. 2 is a flowchart showing a sequence of an automatic focusing operation according to a first embodiment of the present invention.

In FIG. 3, steps S206 and S210 in FIG. 2 are omitted and steps S301 and S302 are newly added instead. Other steps are substantially same as those shown in FIG. 2.

Next, an operation of the image input apparatus will be described below.

When performing a normal image sensing operation for sensing images of high resolution obtained by performing the pixel shifting operation (i.e., image sensing operation performed after the image input apparatus is brought into focus), the image signals obtained from the image sensing device 102 are processed in the same method as described in the first embodiment. Briefly, the image signals are converted into R, G and B signals, stored in the RGB image memory 124, processed by the processor 109 and the encoder 111, then outputted from the interface 112.

Next, a method of focusing operation when sensing an image of high resolution by performing the pixel shifting operation with the aforesaid image input apparatus according to the second embodiment will be described. Referring to FIG. 3, processes in steps S201 to S205 are performed in the same manner as described in the first embodiment with reference to FIG. 2. If it is determined that an image is focused to a predetermined level at step S205, the focus of the image input apparatus is further adjusted on the basis of an image of high resolution obtained by performing the pixel shifting operation to improve a focus state to the level which bears displaying the image of high resolution. In the second embodiment, a user designates an area whose position and size are set for the focus control. Image data of an image in the designated area is used for performing the focus control. Therefore, at step S301, only image data of an image in the designated area is read, and image data of an image outside of the designated area is abandoned when sampling in the S/H circuit 104. Accordingly, it is possible to further increase the speed of focusing operation since the amount of data to be processed decreases comparing to the first embodiment.

Then, after various signal processes are applied to the image data of the image inside of the designated area, the selector 103 switches to connect to the complementary color image memory 107 at step S207, then the image data is stored in the complementary color image memory 107 at step S208. Aforesaid processes are repeated until it is determined at step S209 that all the image data necessary for adjusting the focus of the image input apparatus is obtained by performing the pixel shifting operation.

After all the necessary complementary color image data is obtained, the complementary color image memory controller 123 controls to read image data of the image in the designated area from the complementary color image memory 107 in the order which is suitable for generating RGB image data at step S302.

In steps S211 to S214, the same processes as those described with reference to FIG. 2 are performed. Briefly, the RGB image data of the image of high resolution obtained by performing the pixel shifting operation is generated by the color modulation separator 108, and processed in the processor 109. The BPF 117 extracts high frequency components, necessary for determining a focus state, from the image signals outputted from the processor 109, and the accumulator 118 accumulates focus data from the extracted high frequency components. Further, the lens unit 101 is moved in accordance with the accumulated focus data, and the above processes are repeated until it is determined at step S214 that an image of high resolution is focused.

According to the second embodiment as described above, it is possible to improve focusing precision in a shorter time period when sensing an image of high resolution by performing the pixel shifting operation by performing the focus control in the following sequence: perform the primary focusing operation on the basis of an image obtained before performing pixel shifting operation; fix the lens unit when the image is focused; obtain an image of high resolution in a designated area by performing pixel shifting operation; and perform the secondary focusing operation to adjust the focus of the image input apparatus on the basis of the image data of the high-resolution image.

Note, in the second embodiment, all the image data is read and used in the primary focusing operation, however, it is possible to use image data of an image in a designated area as in the secondary focusing operation.

Further, in the second embodiment, the primary focusing operation is performed on the basis of an image obtained before performing the pixel shifting operation and the secondary focusing operation is further performed to improve the focusing precision on the basis of an image of high resolution obtained by performing the pixel shifting operation performed in the same manner as in an image sensing operation for obtaining an image of high resolution, however, the present invention is not limited to this. For example, in the secondary focusing operation, it is possible to perform the focus control on the basis of an image obtained by combining a plurality of images obtained while shifting the image formation position of the image on the image sensing device less number of times, e.g., only in the vertical direction, horizontal direction, or oblique direction. In this manner, it is possible to achieve similar effect as that of the second embodiment in a shorter time period.

The present invention is not limited to the above embodiments and various changes and modifications can be made within the spirit and scope of the present invention. Therefore to appraise the public of the scope of the present invention, the following claims are made.

What is claimed is:

1. A focus control method used when generating a single high-resolution image from a plurality of images sensed by an image sensing device by performing pixel shifting operation, having a complementary color filter for obtaining complimentary color image signals, memory means for storing the complementary color image signals for generating the single high-resolution image, conversion means for converting the complementary color image signals read from said memory means or complementary color image signals directly inputted, not through said memory means, into primary color image signals, and selection means for switching whether inputting complementary color image signals to said memory means or directly to said conversion means, said method comprising:

a first image sensing step of sensing a color image without performing pixel shifting operation:

a first focusing step of performing focusing operation on the basis of mage data of the color image obtained in said first image sensing image sensing step;

a second image sensing step of sensing color images performing pixel shifting operation; and a second focusing step of performing focusing operation on the basis of image data of the color images obtained in said second image sensing step.

2. The focus control method according to claim 1, wherein, at said second focusing step, the high-resolution image is obtained by performing pixel shifting operation shifting image formation position on the image sensing device in the vertical direction, in the horizontal direction, or in the diagonal direction, or the combination thereof.

3. The focus control method according to claim 1, wherein, at said second focusing step, the focusing operation is performed on the basis of the image data of an image within a predetermined area in the high-resolution image obtained by performing pixel shifting operation.

4. The focus control method according to claim 3, wherein, at said first focusing step, the focusing operation is performed on the basis of the image data of an image within a predetermined area in the image obtained without performing pixel shifting operation.

5. The focus control method according to claim 1 further comprising a step of designating an area in the image, wherein, at said second focusing step, the focusing operation is performed on the basis of the image data of an image within a designated area in the high-resolution image obtained by performing pixel shifting operation.

6. The focus control method according to claim 5, wherein, at said first focusing step, the focusing operation is performed on the basis of the image data of an image within a designated area in the image obtained without performing pixel shifting operation.

7. An image input apparatus capable of generating a single high-resolution image from a plurality of images sensed by performing pixel shifting operation, said apparatus comprising:

automatic focusing means for automatically focusing an image;

control means for when generating a single high-resolution image by performing pixel shifting operation, controlling said automatic focusing means on the basis of image data obtained without performing pixel shifting operation, then on the basis of image data of a high-resolution image obtained by performing pixel shifting operation;

a complementary color filter for obtaining complementary color image signals;

memory means for storing the complementary color image signals;

memory means for storing the complementary color image signals for generating the single high-resolution image;

conversion means for converting the complementary color image signals read from said memory means or complementary color image signals directly inputted, not through said memory means, into primary color image signals; and selection means for switching whether inputting complementary color image signals to said memory means or directly to said conversion means.

8. The image input apparatus according to claim 7, wherein said control means controls said automatic focusing means to focus the image on the basis of the image data of the high-resolution image obtained by performing pixel shifting operation shifting image formation position on an image sensing device in the vertical direction, in the horizontal direction, or in the diagonal direction, or the combination thereof.

9. The image input apparatus according to claim 7, wherein said control means control said automatic focusing means on the basis of the image data within a predetermined area in the high-resolution image obtained by performing pixel shifting operation.

10. The image input apparatus according to claim 9, wherein said control means control said automatic focusing means on the basis of the image data within a predetermined area in the image obtained without performing pixel shifting operation.

11. The image input apparatus according to claim 7, further comprising designating means for designating an area in the image, wherein said control means controls said automatic focusing means on the basis of the image data within a designated area in the high-resolution image obtained by performing pixel shifting operation.

12. The image input apparatus according to claim 11, wherein the focus obtained without performing pixel shifting operation is on the basis of the image data of an image within the designated area.

* * * * *

UNITED STATES PATENT AND TRADEMARK OFFICE
CERTIFICATE OF CORRECTION

PATENT NO. : 5,960,128

DATED : May 29, 1999

INVENTOR(S) : Tetsuya Hamada

It is certified that error appears in the above-identified patent and that said Letters Patent is hereby corrected as shown below:

On the Title Page:

Item [73] Assignee --Canon Kabushiki Kaisha, Tokyo, Japan--

[75] after Tetsuya Hamada delete "c/o Canon Kabushiki Kaisha, 30-2, Shimomaruko 3-chome, Ohta-ku, Tokyo, Japan" and insert --Omiya-shi, Japan--

Column 3, line 34, delete "optic al" and insert --optical--

Column 10, line 9, delete second occurrence "image sensing"

Claim 7, Column 10, delete lines 57-58

Signed and Sealed this

Tenth Day of April, 2001

Attest:

NICHOLAS P. GODICI

*Attesting Officer*    *Acting Director of the United States Patent and Trademark Office*

UNITED STATES PATENT AND TRADEMARK OFFICE
CERTIFICATE OF CORRECTION

PATENT NO. : 5,960,128
DATED : September 28, 1999
INVENTOR(S) : Tetsuya Hamada

It is certified that error appears in the above-identified patent and that said Letters Patent is hereby corrected as shown below:

<u>Title page,</u>
Insert -- [73] Assignee: Canon Kabushiki Kaisha, Tokyo, Japan --
Item [75] after Tetsuya Hamada delete "c/o Canon Kabushiki Kaisha, 30-2, Shimomaruko 3-chome, Ohta-ku, Tokyo, Japan" and insert therefor -- Omiya-shi, Japan --.

Signed and Sealed this

Twenty-third Day of October, 2001

*Attest:*

*Nicholas P. Godici*

*Attesting Officer*

NICHOLAS P. GODICI
*Acting Director of the United States Patent and Trademark Office*